United States Patent
Jang et al.

(10) Patent No.: US 7,979,913 B2
(45) Date of Patent: Jul. 12, 2011

(54) HOME NETWORK SYSTEM AND METHOD THEREFOR

(75) Inventors: Yong-jin Jang, Gwacheon-si (KR); Myung-sun Kim, Uiwang-si (KR); Su-hyun Nam, Seoul (KR); Jae-heung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1119 days.

(21) Appl. No.: 11/000,001

(22) Filed: Dec. 1, 2004

(65) Prior Publication Data

US 2005/0120246 A1 Jun. 2, 2005

Related U.S. Application Data

(60) Provisional application No. 60/525,701, filed on Dec. 1, 2003.

(30) Foreign Application Priority Data

Feb. 9, 2004 (KR) .................. 10-2004-0008343

(51) Int. Cl.
*G06F 21/24* (2006.01)
(52) U.S. Cl. ............... 726/29; 726/3; 726/4; 726/12; 726/26; 726/27; 726/30
(58) Field of Classification Search ............. 713/155, 713/170, 171, 169; 726/3, 4, 17, 12, 26, 726/27, 29, 30; 455/410, 411; 709/230, 709/225
See application file for complete search history.

(56) References Cited

U.S. PATENT DOCUMENTS

| | | | |
|---|---|---|---|
| 5,825,890 A * | 10/1998 | Elgamal et al. | ............... 713/151 |
| 6,198,479 B1 | 3/2001 | Humpleman et al. | |
| 6,393,467 B1 | 5/2002 | Potvin | |
| 6,430,629 B1 | 8/2002 | Smyers | |
| 6,580,950 B1 | 6/2003 | Johnson et al. | |
| 6,584,096 B1 | 6/2003 | Allan | |
| 7,127,613 B2 * | 10/2006 | Pabla et al. | ................... 713/171 |

(Continued)

FOREIGN PATENT DOCUMENTS

CN 1363160 8/2002

(Continued)

OTHER PUBLICATIONS

Japanese Office Action dated Aug. 10, 2010, issued in counterpart application No. 2006-542493.

(Continued)

*Primary Examiner* — Minh Dinh
*Assistant Examiner* — Izunna Okeke
(74) *Attorney, Agent, or Firm* — Sughrue Mion, PLLC

(57) ABSTRACT

A home network system allowing a user to directly control joining or removing of member devices in a domain using a user interface and to effectively control a status change of the member devices of the domain and a management method therefor. The home network system includes: a master device, which forms a domain with more than one controlled device, transmits a predetermined domain key to the controlled devices included in the domain, generates a new domain key whenever a configuration of the domain is changed, and transmits the new domain key to the controlled devices remaining in the domain; and a control point, which provides a user interface allowing a user to directly change the configuration of the domain.

21 Claims, 15 Drawing Sheets

U.S. PATENT DOCUMENTS

| | | | |
|---|---|---|---|
| 7,254,708 B2 * | 8/2007 | Silvester ........................ | 713/170 |
| 2002/0083143 A1 * | 6/2002 | Cheng ........................... | 709/208 |
| 2002/0147797 A1 | 10/2002 | Paul | |
| 2003/0074450 A1 | 4/2003 | Kang | |
| 2003/0095524 A1 * | 5/2003 | Stephens et al. .............. | 370/338 |
| 2003/0169728 A1 | 9/2003 | Choi | |
| 2005/0086532 A1 * | 4/2005 | Lotspiech et al. ............. | 713/201 |
| 2005/0120216 A1 * | 6/2005 | Lee et al. ....................... | 713/171 |
| 2005/0138193 A1 * | 6/2005 | Encarnacion et al. ........ | 709/230 |
| 2005/0188193 A1 * | 8/2005 | Kuehnel et al. ............... | 713/155 |
| 2006/0020784 A1 * | 1/2006 | Jonker et al. .................. | 713/157 |

FOREIGN PATENT DOCUMENTS

| | | |
|---|---|---|
| EP | 1 521 423 A2 | 4/2005 |
| JP | 2001203680 A | 7/2001 |
| JP | 2002-353968 A | 12/2002 |
| JP | 2003-008576 A | 1/2003 |
| JP | 2003008583 A | 1/2003 |
| KR | 2000-0033887 A | 6/2000 |
| KR | 2002-0060950 A | 7/2002 |
| KR | 2002-0080800 A | 10/2002 |
| KR | 2003-0059959 A | 7/2003 |
| KR | 10-2003-0073433 A | 9/2003 |
| WO | 00/77648 A1 | 12/2000 |
| WO | 03/034408 | 4/2003 |

OTHER PUBLICATIONS

Office Action dated Sep. 28, 2010, issued in corresponding Korean application No. 10-2004-0008343.

* cited by examiner

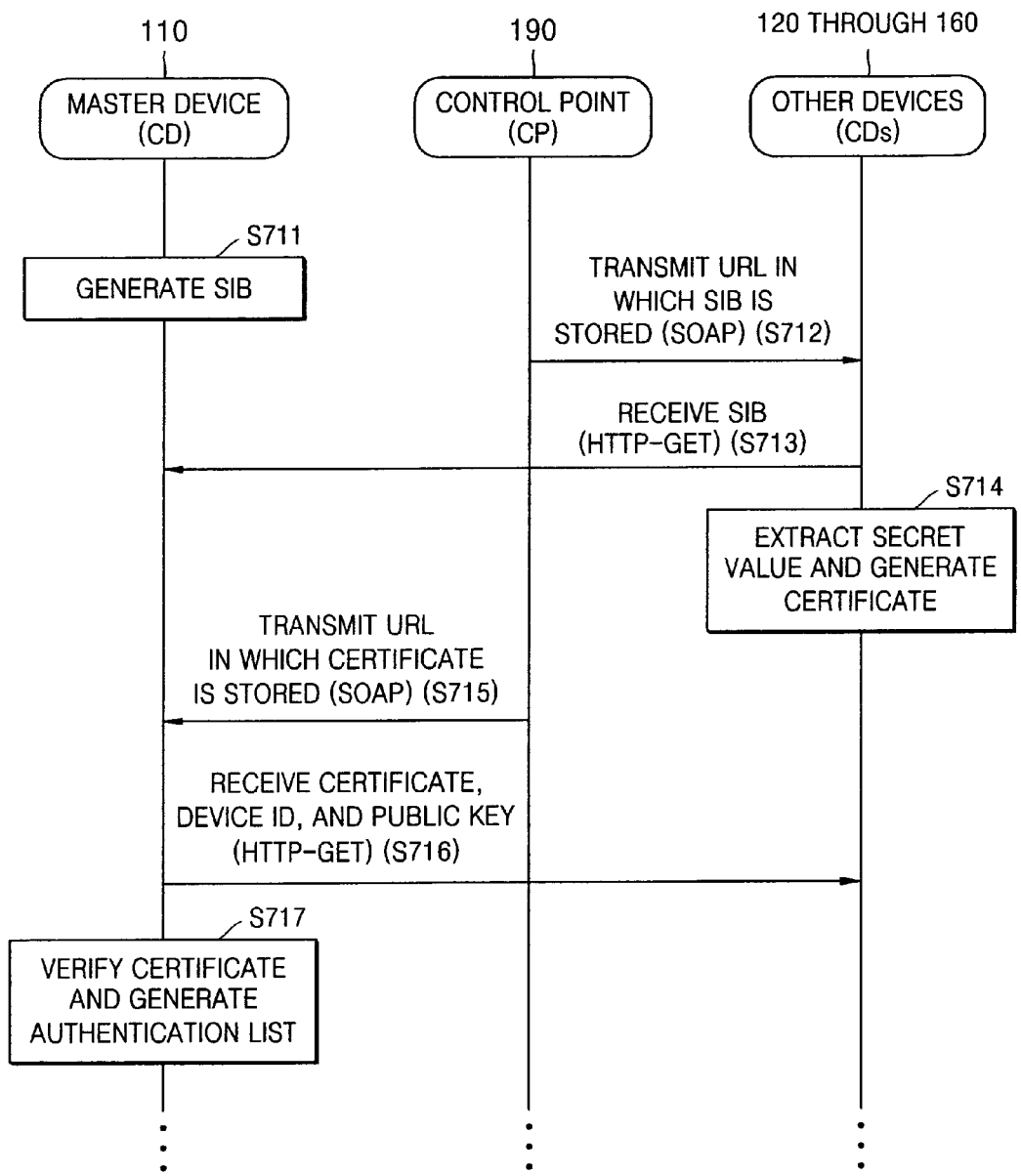

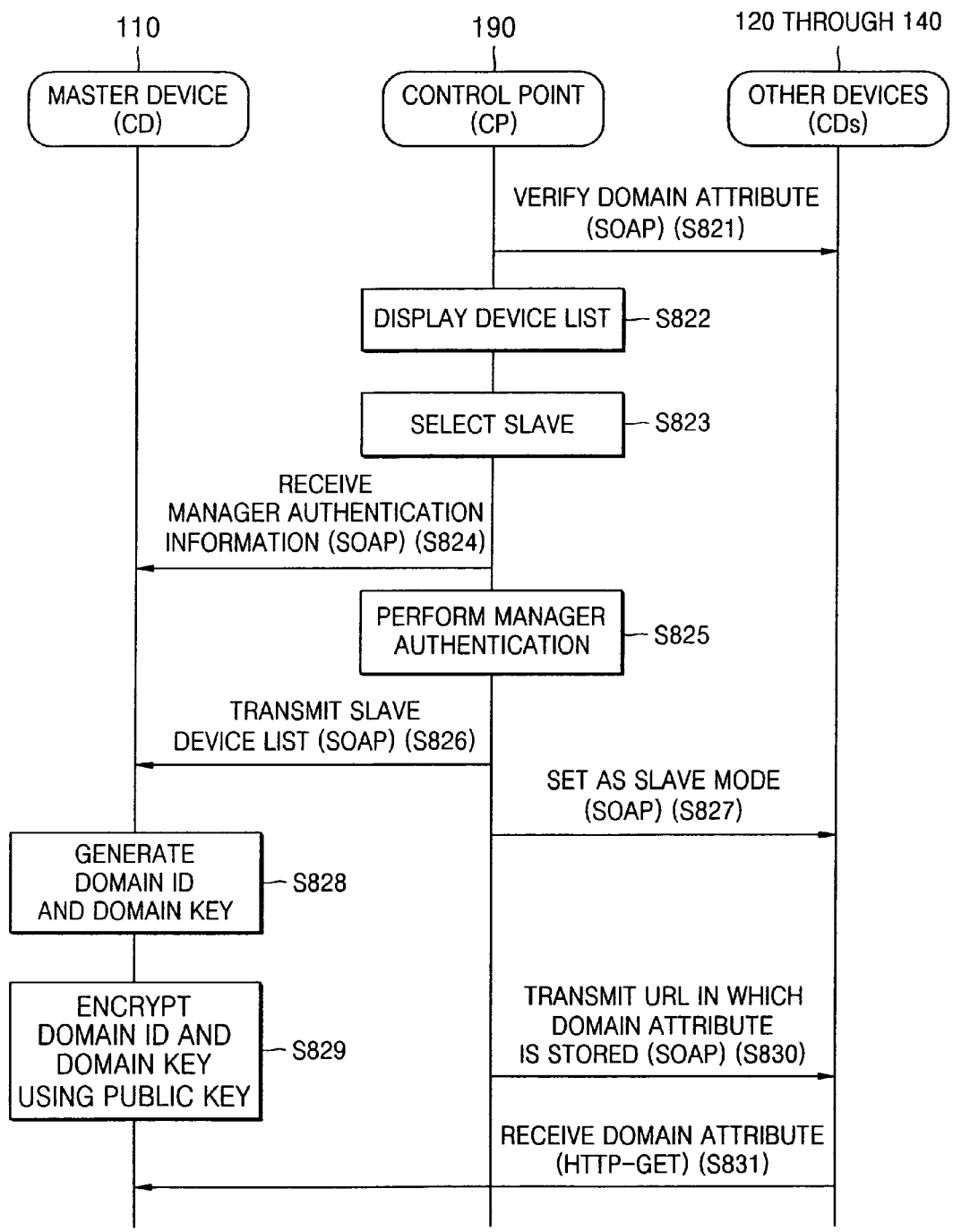

FIG. 9A

| FRIENDLY NAME | MODE | FLAG |
|---|---|---|
| MAIN NEXUS | GUEST | V |
| SUB NEXUS | GUEST | |

FIG. 9B

MANAGER AUTHENTICATION

ID:0314620157
PASSWORD:....

FIG. 9C

| FRIENDLY NAME | MODE | FLAG |
|---|---|---|
| SUB NEXUS | GUEST | V |
| NOTE PC1 | GUEST | V |
| NOTE PC2 | GUEST | V |

HOME NETWORK SYSTEM AND METHOD THEREFOR

CROSS-REFERENCE TO RELATED APPLICATION

This application claims priority from the U.S. Provisional Application No. 60/525,701 filed on Dec. 1, 2003, in the U.S. Patent and Trademark Office and Korean Patent Application No. 2004-8343, filed on Feb. 9, 2004, in the Korean Intellectual Property Office, the disclosures of which are incorporated herein in their entirety by reference.

BACKGROUND OF THE INVENTION

1. Field of the Invention

The present invention relates to a method of managing devices in a domain of a home network, and more particularly, to a home network system allowing a user to directly connect or disconnect member devices in a domain using a user interface and to effectively control a status change of the member devices in the domain and a management method therefor.

2. Description of the Related Art

Home network technologies for protecting contents on a home network, such as 'SmartRight' by Thomson corporation, 'open conditional content access management (OC-CAM)' by Sysco corporation, and 'xCP cluster protocol' by IBM, have been recently suggested.

The SmartRight is a method of placing a smart card including a public key certificate in each device in a home network and generating a key for the home network by exchanging the certificates between devices using the smart card.

The OCCAM is a method by which devices in a home network use contents using a unique ticket of each of the contents.

The xCP cluster protocol, a technology based on broad encryption, is a method of using a domain concept called a cluster and freely using contents among devices included in the cluster.

FIG. 1 is a block diagram illustrating a conventional home domain structure.

Referring to FIG. 1, an authenticated home domain 100 includes a master device 110 and a plurality of slave devices 120 through 140. A domain is managed between the master device 110 and the plurality of slave devices 120 through 140.

A content reproducing process based on the xCP cluster protocol will now be described with reference to FIG. 2.

FIG. 2 is a flowchart illustrating a content reproducing process based on the xCP cluster protocol according to a conventional master-slave structure.

Referring to FIG. 2, the content reproducing process is largely divided into a cluster generation process in step S200, a device authentication process in step S210, a content encryption process in step S220, and a content decryption process in step S230, and operates as follows.

A server, which is initially linked to a home network, generates a binding identification (IDb) of the home network in step S200. Here, the IDb can be a unique identifier set when the server was manufactured or a unique identifier set by a user. When the IDb is generated, a cluster idetified by the IDb is generated.

A device, which intends to use contents stored in the server, extracts a media key (Km) from a media key block (MKB) using its own device key set in step S212. The device generates a personal key (Kp) using the extracted Km and a personal ID (IDp) in step S214. The device requests device authentication from the server to be authenticated as a member device in step S216. That is, the device transmits the IDp, which is a personal unique identifier, a 'type', which is a type identifier representing a type of the device, and a value h=MAC(IDp||type)Kp, which is a hash value of the IDp and the type, to a device authentication server in the cluster or outside the cluster.

The server obtains a value Kp' using the Km and the IDp, compares a hash value h'=MAC(IDp||type)Kp' obtained using the value Kp' and the hash value h received from the device, and determines whether the hash values h and h' are the same. If the hash values h and h' are the same, the server transmits a value E(IDb)Kp, in which the IDb is encrypted using the Kp, and the IDp to the device and adds the IDp in its own authentication table (auth.tab). The device extracts the IDb from the value E(IDb)Kp received from the server, and then the device authentication is accomplished in step S218.

After the device authentication is accomplished, the server encrypts a content to be transmitted to the device in step S220. First, the server generates a binding key (Kb) using the IDb, auth.tab, and Km in step S222, wherein Kb=H[IDb⊕H[auth.tab],Km].

The server encrypts the content using a title key (Kt) to protect the content in step S224. Usage rule (UR) information including copy control information, information whether transferring is permitted, usage rights, and license effective period is contained in each content. The server encrypts the UR information and the Kt using the Kb such as E(Kt⊕H[UR])Kb in step S226.

The device receives the auth.tab from the server, extracts the Kb from Kb=H[IDb⊕H[auth.tab],Km] using the extracted Km and IDb in step S232, extracts the Kt from E(Kt⊕H[UR])Kb in step S234, and decrypts the content received from the server using the extracted Kt in step S236.

According to the xCP cluster protocol described above, all devices in a communication range can automatically join a domain without selection or definition of the devices to be included in the domain. Also, whenever each device newly generates a Kb, the device must receive an auth.tab from a server and perform a computation. Therefore, it is necessary to determine member devices of a home domain under control of a user and protect contents more securely by building the home domain to be independent from the outside.

Lately, a method of managing a home network using a universal plug and play (UPnP) infrastructure has been suggested. The UPnP is generally a standardized function to recognize computer peripherals connected to a general use computer. Furthermore, the UPnP is being improved as a network middleware standard, by which home alliances and wireless devices besides the computer peripherals can automatically be recognized when they are connected to a network. Also, since the UPnP uses a conventional standard Internet protocol, the UPnP can be smoothly integrated in a conventional network and does not rely on a special operating system or physical medium. However, since a method of managing a domain using the UPnP is not known yet, it is necessary to develop a method of effectively managing a domain using the UPnP.

SUMMARY OF THE INVENTION

The present invention provides a method of managing a home network, which allows a user to directly control formation of a domain and build more securely the domain to be independent from the outside.

The present invention also provides a home network system based on UPnP, which can be smoothly integrated in a network using a conventional Internet protocol.

The present invention also provides a method of and an apparatus for simplifying a domain key change process according to a configuration change of a domain by allowing a user to directly control a status change of member devices of the domain in a home network, a master device to take charge of generation of a new domain key according to the change of the member devices, and slave devices to receive the domain key generated by the master device.

The present invention also provides a method of and an apparatus for preventing a domain key of frequently being changed by introducing a session ID besides a domain ID and the domain key as information shared by a domain.

According to an aspect of the present invention, there is provided a home network system comprising: a master device, which forms a domain with at least more than one controlled device, transmits a predetermined domain key to the controlled devices included in the domain, generates a new domain key whenever a configuration of the domain is changed, and transmits the new domain key to the controlled devices remained in the domain; and a control point, which provides a user interface allowing a user to directly change the configuration of the domain.

According to one embodiment, some of the devices forming the domain provide predetermined contents.

According to another embodiment, the domain key is used for encrypting content keys used for encrypting the predetermined contents.

According to yet another embodiment, the domain key is encrypted using a public key of a controlled device receiving the predetermined contents and the encrypted domain key is decrypted using a predetermined secret key forming a pair with the public key.

According to yet another embodiment, the home network system is built based on UPnP.

According to yet another embodiment, the domain key is generated using device information of the devices forming the domain.

According to yet another embodiment, the control point transmit information necessary for operating the master device and the controlled devices forming the domain to the master device and the controlled devices forming the domain.

According to another embodiment, member devices forming the domain share a session ID changed according to change of the member devices forming the domain, and if a session ID of a device connected to the domain is not the same as that of the master device, the master device transmits a domain key stored in the master device to the connected device.

According to another embodiment, each of the controlled devices has a slave status or a guest status as a device mode, and if a session ID of a device connected to the domain is not the same as that of the master device and the connected device exists in a slave device list stored in the master device, the master device transmits the domain key stored in the master device to the connected device.

According to another embodiment, if the connected device does not exist in the slave device list stored in the master device, a device mode of the connected device is changed to a guest status.

According to another embodiment, if a domain ID of a device connected to the domain is not the same as that stored in the master device, the master device does not transmit the domain key to the connected device.

According to another embodiment, if a device mode of a device connected to the domain is not a slave status, the master device does not transmit the domain key to the connected device.

According to another embodiment, the session ID further comprises date information and/or version information besides a unique ID.

According to another aspect of the present invention, there is provided a method of managing a home network system comprising a master device, which forms a domain with more than one controlled device and transmits a predetermined domain key to the controlled devices included in the domain, and a control point, which provides a user interface, the method comprising: (a) changing a configuration of the domain in response to a user's command input using the user interface; (b) generating a new domain key according to the configuration change of the domain in the master device; and (c) transmitting the generated domain key to controlled devices remained in the domain.

According to one embodiment, the home network system is built based on UPnP.

According to one embodiment, the domain key is generated using device information of the devices forming the domain.

According to one embodiment, the method further comprises: (d) sharing a session ID changed according to a status change of member devices forming the domain with the member devices of the domain; and (e) if a session ID of a device connected to the domain is not the same as that of the domain, the master device transmits a domain key of the domain to the connected device.

According to one embodiment, each of the controlled devices has a slave status or a guest status as a device mode, and in step (e), if a session ID of a device connected to the domain is not the same as that of the domain and the connected device exists in a slave device list stored in the master device, the domain key stored in the master device is transmitted to the connected device.

According to one embodiment, in step (e), if the device connected to the domain does not exist in the slave device list, a device mode of the connected device be set to a guest status.

According to one embodiment, step (e) comprises, if a domain ID of the device connected to the domain is not the same as that of the domain, not transmitting the domain key to the connected device.

According to another embodiment, step (e) comprises, if a device mode of the device connected to the domain is not a slave status, not transmitting the domain key to the connected device.

According to another embodiment, the session ID further comprises date information and/or version information besides a unique ID.

According to another aspect of the present invention, there is provided a home network management control apparatus of a home network system comprising a master device, which forms a domain with more than one controlled device, the apparatus comprising: a user interface provider, which provides a user interface allowing a user to directly change a configuration of the domain; and a device operating information provider, which transmits information necessary for operating member devices of the domain to the member devices of the domain according to a user's command input using the user interface.

According to another aspect of the present invention, there is provided a home network management control apparatus in a home network system comprising a master device, which forms a domain with more than one controlled device, the apparatus comprising: a user interface provider, which provides a user interface allowing a user to directly change a configuration of the domain; a device detector, which detects a device connected to the home network management control apparatus; and a device operating information provider, which transmits information of the connected device to the master device and a processing result of the master device to the connected device.

According to another aspect of the present invention, there is provided a master device, which forms a domain with more than one controlled device, the master device comprising: a controlled device manager, which performs authentication of the controlled devices; a domain ID manager, which generates a domain ID identifying the domain and transmits the domain ID to member devices of the domain; a session ID manager, which generates a session ID changed according to a configuration change of the domain and transmits the session ID to the member devices of the domain; and a domain key manager, which generates a domain key changed according to the configuration change of the domain and transmits the domain key to the member devices of the domain.

According to another aspect of the present invention, there is provided a method of managing controlled devices by a master device, which forms a domain with more than one controlled device, the method comprising: (a) performing authentication of the controlled devices; (b) generating a domain ID identifying the domain and transmitting the domain ID to member devices of the domain; (c) generating a session ID changed according to a configuration change of the domain and transmitting the session ID to the member devices of the domain; and (d) generating a domain key changed according to the configuration change of the domain and transmitting the domain key to the member devices of the domain.

According to another aspect of the present invention, there is provided a computer readable medium having recorded thereon a computer readable program for performing the method of managing controlled devices.

According to another aspect of the present invention, there is provided a master device, which forms a domain with slave devices, each slave device operating in a slave status as a device mode, a plurality of controlled devices operating in a slave status or a guest status as the device mode, the master device comprising: a controlled device manager, which performs authentication and device mode determination of a device connected to the domain, generates and changes a slave device list, and determines whether the connected device exists in the slave device list; a domain ID manager, which generates a domain ID identifying the domain and compares the domain ID of the master device and that of the connected device; a session ID manager, which compares a session ID of the master device, which is changed according to a configuration change of the domain, and that of the connected device; and a domain key manager, which generates a domain key changed according to the configuration change of the domain, and if the domain IDs are the same as a comparison result of the domain ID manager, the session IDs are not the same as a comparison result of the session ID manager, and the connected device exists in the slave device list as a determination result of the controlled device manager, transmits the domain key of the master device to the connected device.

According to another aspect of the present invention, there is provided a method of managing controlled devices by a master device, which forms a domain with slave devices, each slave device operating in a slave status as a device mode, a plurality of controlled devices operating in a slave status or a guest status as the device mode, the method comprising: (a) performing authentication of a device connected to the domain; (b) if the authentication succeeded, determining the device mode of the connected device; (c) if the device mode of the connected device is a slave status as a determination result of step (b), comparing a session ID of the master device and that of the connected device; (d) if the session IDs are not the same as a comparison result of step (c), determining whether the connected device exists in a slave device list showing controlled devices, each device mode of which is a slave status; and (e) if the connected device exists in the slave device list as a determination result of step (d), transmitting a domain key of the master device, which is changed according to a configuration change of the domain, to the connected device.

According to another embodiment, before at least step (c), the method further comprises comparing a domain ID, by which the domain can be identified and which is shared by member devices of the domain, and a domain ID of the connected device, and if the domain IDs are not the same, not performing the next steps.

According to another aspect of the present invention, there is provided a computer readable medium having recorded thereon a computer readable program for performing the method of managing controlled devices.

BRIEF DESCRIPTION OF THE DRAWINGS

The above and other features and advantages of the present invention will become more apparent by describing in detail exemplary embodiments thereof with reference to the attached drawings in which:

FIG. 7 is a flowchart illustrating a device authentication process, in parallel with the process illustrated in FIG. 6;

FIG. 8 is a flowchart illustrating a process of determining a slave device, in parallel with the process illustrated in FIG. 7;

FIGS. 9A through 9C illustrate user interface presentations provided by a control point;

DETAILED DESCRIPTION OF THE INVENTION

Hereinafter, the present invention will now be described more fully with reference to the accompanying drawings, in which exemplary embodiments of the invention are shown. Like reference numbers are used to refer to like elements through on the drawings.

Figure 1:
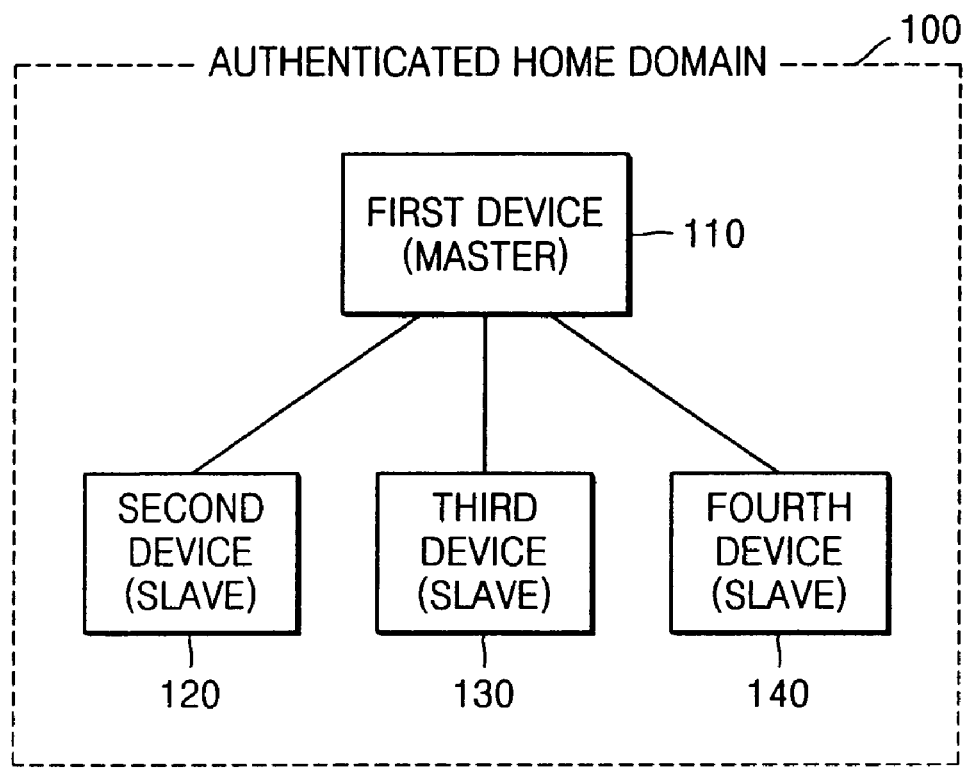
FIG. 1 is a block diagram illustrating a conventional home domain structure.
Figure 2:
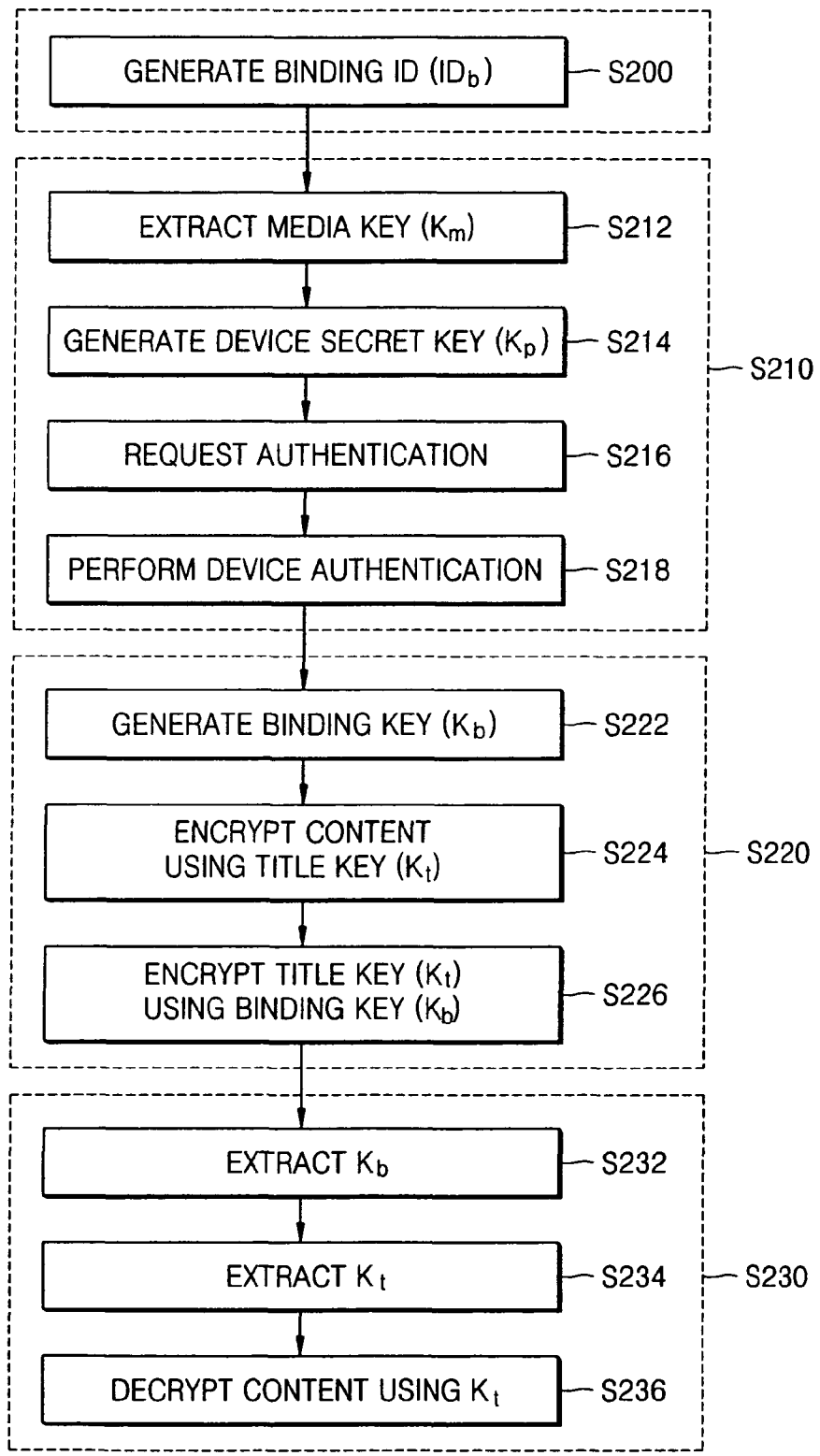
FIG. 2 is a flowchart illustrating a content reproducing process based on an 'xCP cluster protocol' according to a conventional master-slave structure.
Figure 3:
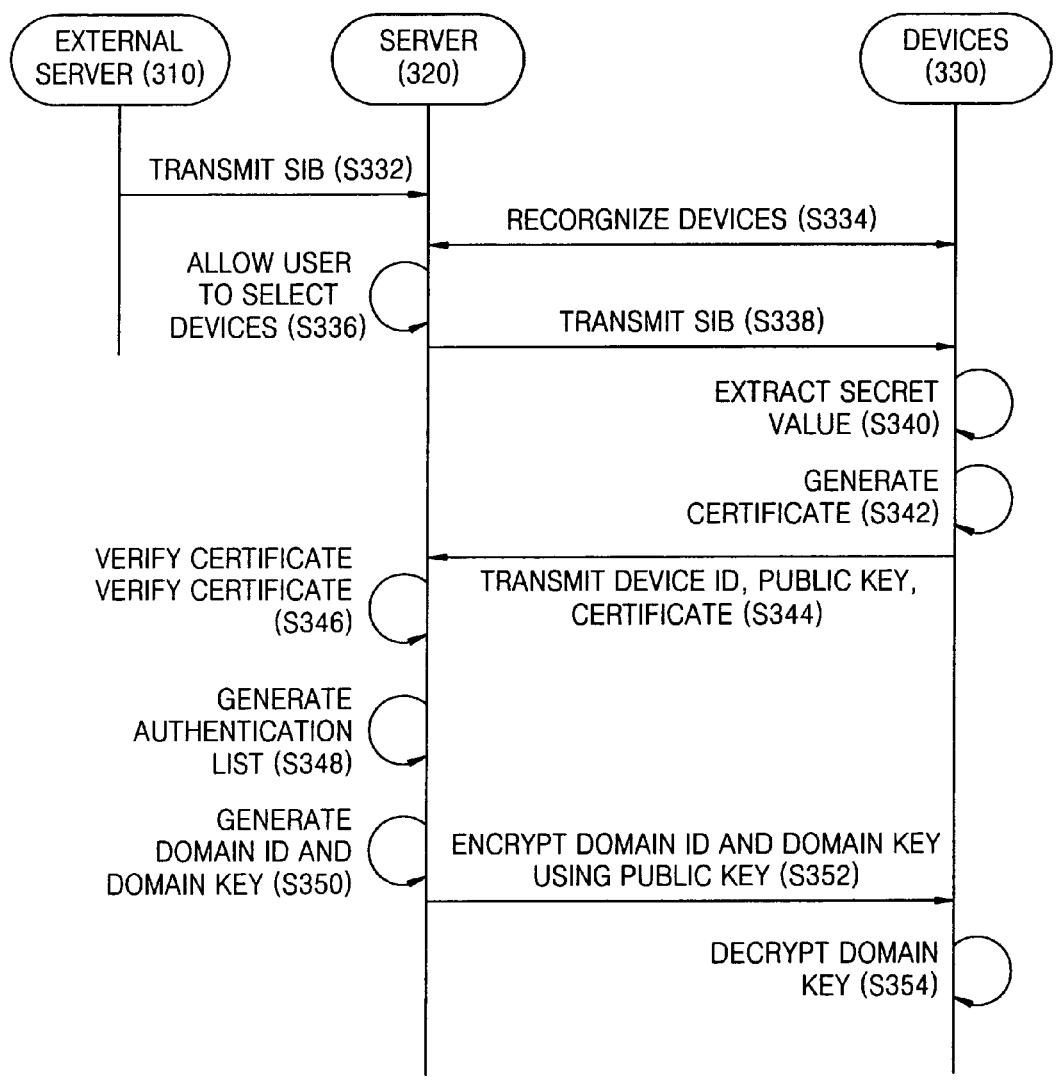
FIG. 3 is a flowchart illustrating a method of building a domain of a public key infrastructure (PKI)

FIG. 3 is a flowchart illustrating a method of building a domain of a public key infrastructure (PKI). It is presumed that each of devices requesting content from a content supply server has a unique secret key set, and a public key or a function of generating the public key set when the devices are produced. Here, the secret key set is used for extracting a secret value from a secret information block (SIB) provided by a broadcast encryption method. The SIB is information for verifying whether devices are rejected. The rejected devices cannot extract a secret value from the SIB, and accepted devices can extract the common secret value from the SIB.

To build the domain, a server 320 receives an SIB from an external server 310 by a broadcast encryption method in step S332. In step S334, the server 320 recognizes the existence of devices 330 by receiving information from the devices 330 in this regard via a wired or wireless network or by detecting the devices 330.

The server 320 displays the recognized devices 330 on a display apparatus, and a user selects the devices 330 to be enrolled in the domain among the devices displayed on the display apparatus in step S336. The server 320 transmits the SIB received from the external server 310 to the devices 330 selected by the user in step S338. Each of the devices 330, which have received the SIB, extracts a secret value from the SIB in step S340 and generates a certificate of an own public key using the extracted secret value in step S342.

When each of the devices 330 transmits the certificate, a device unique identifier (ID), and the public key, which every device has, to the server 320 in step S344, the server 320 checks the devices 330 by verifying the certificates in step S346 and generates an authentication list in which unique IDs and public keys of the authenticated devices are written in step S348. Here, the number of authenticable devices may be limited by the user at will.

After generating the authentication list, the server 320 generates a unique domain ID and a unique domain key using information of the devices in the authentication list and a random number generated by the server 320 in step S350. At this time, the domain key, which is a secret key shared only by devices included in a domain built by the user, is changed whenever member devices included in the domain are changed, and the domain ID is used as an identifier for identifying the domain from other domains.

The server 320 encrypts the domain ID and the domain key using the public keys of the devices 330 and transmits the encrypted domain ID and domain key to the authenticated devices 330 in the domain in step S352. The devices 330 decrypt the domain key using their own secret keys in step S354. Then, a domain for using contents is built. When the domain for using contents is built, the server 320 encrypts a content using a content key and the content key using the domain key. A device, which intends to use the content, can use the content by decrypting the encrypted content using the domain key.

Figure 4:
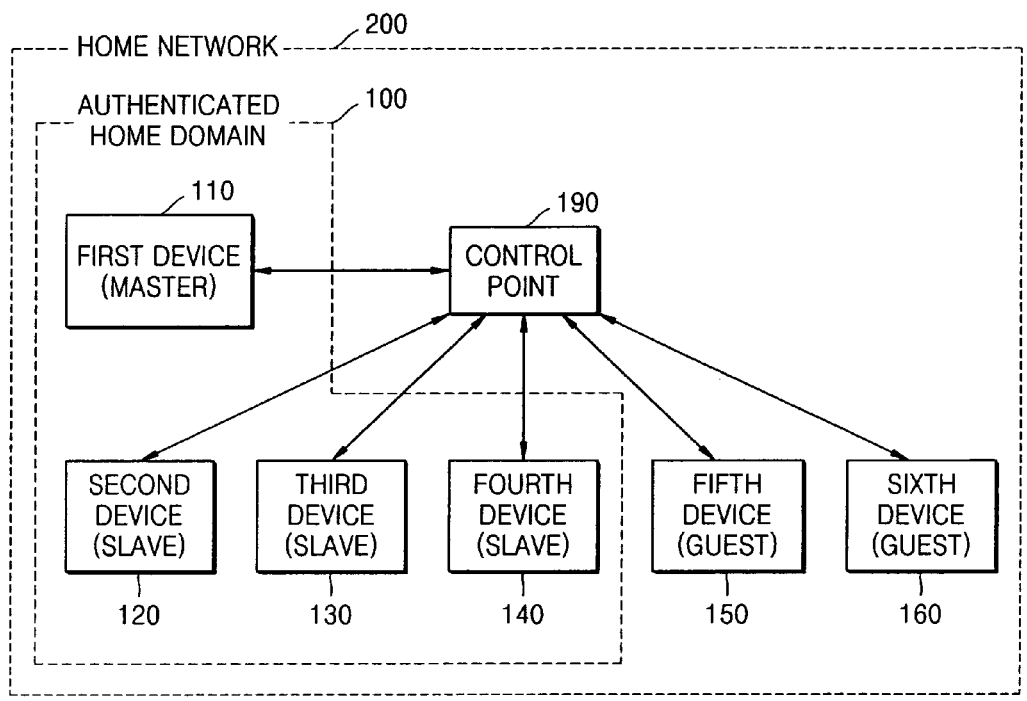
FIG. 4 is a block diagram illustrating UPnP adopting a method of building a domain according to an embodiment of the present invention.

FIG. 4 is a block diagram illustrating UPnP adopting a method of building a domain according to an embodiment of the present invention.

Controlled devices (CD) 110 through 160 receive commands from and provide services to a control point (CP) 190. A domain can be built by setting one device 110 of the controlled devices 110 through 160 as a master device and devices 120 through 140 selected by a user as slave devices.

The devices 150 and 160, which are not set as the master device or the slave devices among the controlled devices 110 through 160, are called guest devices. The master device 110 and the slave devices 120 through 140 form an authenticated home domain 100, and the CP 190 and all of the controlled devices 110 through 160 form a home network 200.

Figure 5:
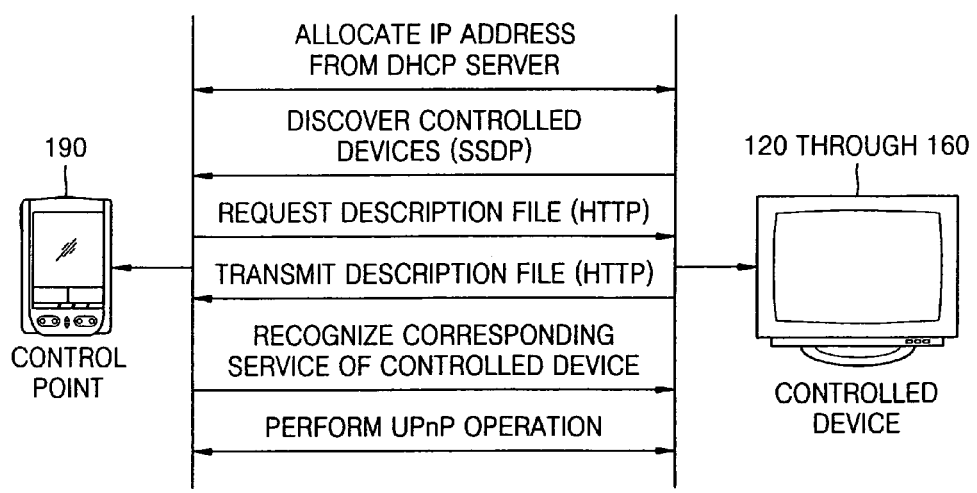
FIG. 5 illustrates a typical UPnP operation performed between a control point and controlled devices.

FIG. 5 illustrates a typical UPnP operation performed between the control point 190 and the controlled devices 120 through 160. First, an addressing process is performed. An infrastructure of a UPnP network is a TCP/IP protocol, and a key function of the protocol is an addressing function. Each device must be a dynamic host configuration protocol (DHCP) client, and when a device is connected to the UPnP network at first, the device searches a DHCP server. If a DHCP server is found, the device uses an allocated IP address. If a DHCP server is not found, the device uses an automatic IP (auto IP) to secure an address.

Next, a discovery process is performed. If devices are connected to a network and appropriately addressed, a search operation can be performed. The search operation is performed using a simple service discovery protocol (SSDP). If other devices are added to the network, services provided by these devices are transmitted to a control point in the network using the SSDP.

Thereafter, a description process is performed. Even if the control point has been informed of the services provided by the devices, the control point still has little information on the devices. In order for the control point to interact with each device using information of the device and functions of the device, the control point must confirm a description of each device from a search message and a uniform resource locator (URL) provided by each device. A UPnP description of each device is represented with an extensible markup language (XML) and includes unique manufacturing information (a model name, a serial number, a manufacturer name, a manufacturer URL, etc.) The description also includes a plurality of built-in devices and service lists besides the URL for control, eventing, and presentation.

Finally, a UPnP operation process is performed. The UPnP operation process is performed through control, eventing, and presentation operations. In the control operation, the control point secures the description of each device and then performs an essential operation for device control. To control the device, the control point transmits a service operation command to the device. That is, the control point transmits an appropriate control message to a control URL (described in a device manual) for a corresponding service. The control message is also represented with the XML using a simple object access protocol (SOAP). The corresponding service is a response against the control message and provides a specific operation value or an error code.

In the eventing operation, each device receives the command, and if a status of a device is changed, the device informs the control point of the status change using an event message. The event message includes more than one status variable name and current values of the variables. Also, the event message is represented with the XML and formatted using a generic event notification architecture (GENA).

Details of the event are periodically updated and continuously notified to the control point. Also, join can be cancelled using the GENA.

In the presentation operation, if a device has a URL for presentation, the control point can search a page through the URL and load the page on a browser, and users can control the device or inquire of a status of the device using the page. How well the functions can be performed relies upon a presentation page and a specific function of the device.

Figure 6:
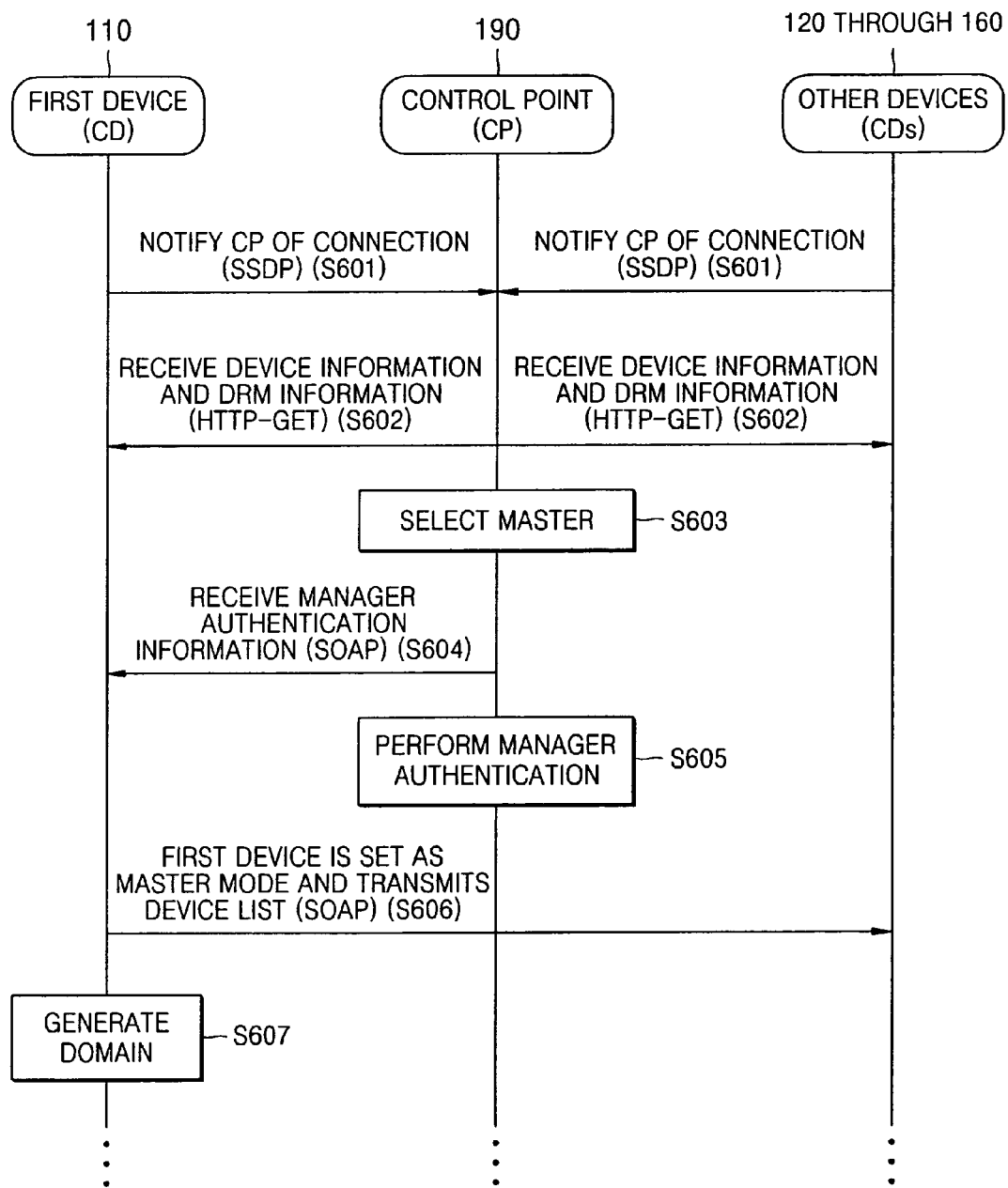
FIG. 6 is a flowchart illustrating a process of determining a master device according to an embodiment of the present invention.

FIG. 6 illustrates a process of determining a master device in a process of building a home network of a UPnP infrastructure.

Referring to FIG. 6, first, all of the controlled devices 110 through 160 notify a control point 190 that they are connected to a home network using the SSDP in step S601. The control point 190 receives device information and digital right management (DRM) information from the devices 110 through 160 using a hypertext transfer protocol (HTTP) in step S602. The device information includes typical device information used in the UPnP, and the DRM information includes a device attribute and a device mode. Here, the device attribute, which is a value determining whether a controlled device can be a master device or not, is information notifying whether the controlled device can operate as a domain master device. The device mode is a value determining whether the controlled device currently operates as a master device, a slave device, or a guest device. Initially, all of the controlled devices are set as guest devices, and thereafter, if a controlled device is set as the master device or the slave device, the device mode of the controlled device is changed.

The control point 190 determines whether a controlled device whose device mode of the DRM information is a master status exists, and if no controlled devices operating as the master device exist, the control point 190 selects one of controlled devices that can be a master device as the master device in step S603. The master device selection is performed by a user using a user interface of the control point 190. An example of the user interface is shown in FIG. 9A. In the user interface, unmasterable devices 'main nexus' and 'sub nexus' are displayed, and they are currently set as the guest devices. The user can select a device that the user intends to set as the master device among the devices. In the present embodiment, a first controlled device 110 is set as the master device.

The control point 190 receives manager authentication information from the first controlled device 110 set as the master device using the SOAP in step S604. The manager authentication information can be obtained from a smart card of the master device, for example. Also, the manager authentication information is necessary for a process of confirming that a user who has determined the master device is a manager. The control point 190 performs manager authentication by outputting a user interface using the manager authentication information and inputting a manager ID and a password by the user in step S605. An example of the user interface is shown in FIG. 9B.

The control point 190 sets the first controlled device 110 as the domain master device and transmits a device list stored in the control point 190 to the first controlled device 110 in step S606. Then, the device mode of the first controlled device 110 becomes the master status. The first controlled device 110 set as the master device generates a new domain where only the own device is a member device at first in step S607.

FIG. 7 is a flowchart illustrating a device authentication process, in parallel with the process of determining a master device illustrated in FIG. 6.

Referring to FIG. 7, first, a domain master 110 receives a new SIB from an external server by the method illustrated in FIG. 3, step S711. Accordingly, a control point 190 transmits information of a URL, in which the SIB is stored, to other controlled devices 120 through 160 using the SOAP in step 712. The other controlled devices 120 through 160 receive the SIB stored in the URL using the HTTP in step S713. Each of the other controlled devices 120 through 160 extracts a secret value using the SIB and generates a certificate using the secret value and a personal device ID and a personal public key in step S714. The certificate is used to distinguish the devices with an illegal device. For example, if an authentication policy that only devices produced by a specific manufacturer are admitted as legal devices is maintained, devices produced by other manufacturers will be treated as illegal devices.

Next, when the control point 190 transmits information of the URL, in which the certificates are stored, to the master device 110 using the SOAP in step S715, the master device 110 receives the certificates, the device IDs, and the public keys from the other controlled devices 120 through 160 using the HTTP in step S716. Also, the control point 190 verifies the received certificates and generates a list of the authenticated devices in step S717. Devices treated as illegal devices as a result of the certificate verification are excluded from the domain, and there is no possibility for these devices to be designated as slave devices.

FIG. 8 is a flowchart illustrating a process of determining a slave device, in parallel with the device authentication process illustrated in FIG. 7.

Referring to FIG. 8, first, a control point 190 verifies domain attributes of devices 120 through 140 authenticated as legal devices as a result of the certificate verification using the SOAP in step S821. The domain attribute includes a domain key, a device name in a domain, and the number of devices in the domain. If there are no domain attributes in the devices, the control point 190 displays a list of the devices using a user interface in step S822 and allows a user to select slave devices using the user interface in step S823. An example of the user interface displaying a list of legal devices 120 through 140 is shown in FIG. 9C. The user can select slave devices by checking devices to be included in the domain. The user can select a plurality of slave devices different from a situation of selecting a master device. The control point 190 receives manager authentication information from the master device 110 in step S824 and performs manager authentication in step S825 such a method as illustrated in FIG. 6.

Next, the control point 190 transmits a list of the selected slave devices to the master device 110 using the SOAP in step S826 and sets device modes of the selected devices as a slave status in step S827. The master device 110 generates a domain ID and a domain key using the slave device list in step S828. The master device 110 encrypts the domain ID and the domain key using public keys of the slave devices in step S829. Also, the master device 110 stores the slave device list of the devices selected as slave devices.

Finally, the control point 190 transmits URL information of the master device 110 storing the domain attributes to the devices selected as slave devices using the SOAP in step S830. Then, the devices selected as slave devices receive the domain attributes from the URL using the HTTP in step S831. As described above, the domain attribute includes information of a domain key, a device name in the domain, and the number of devices in the domain.

Figure 10:
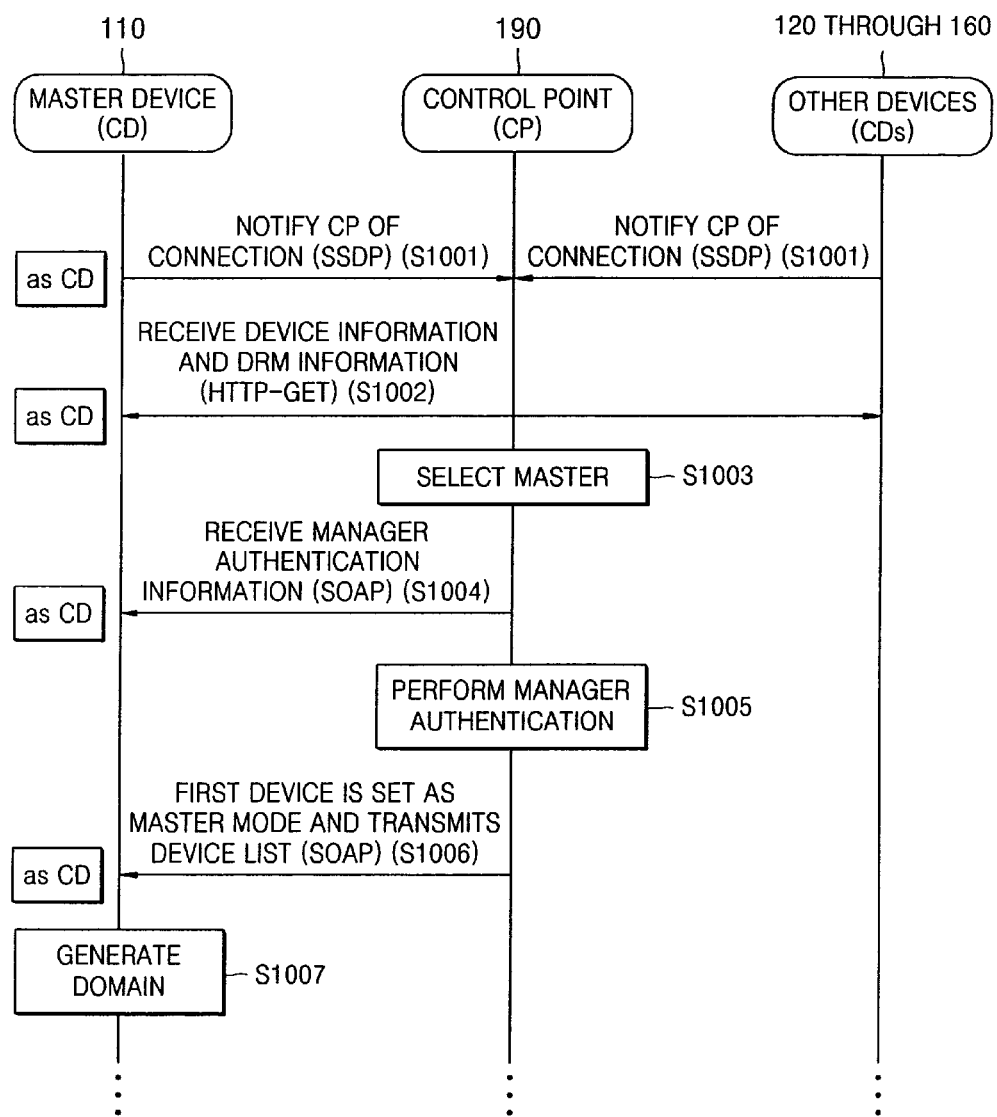
FIG. 10 is a flowchart illustrating another process of determining a master device according to an exemplary embodiment of the present invention.
Figure 11:
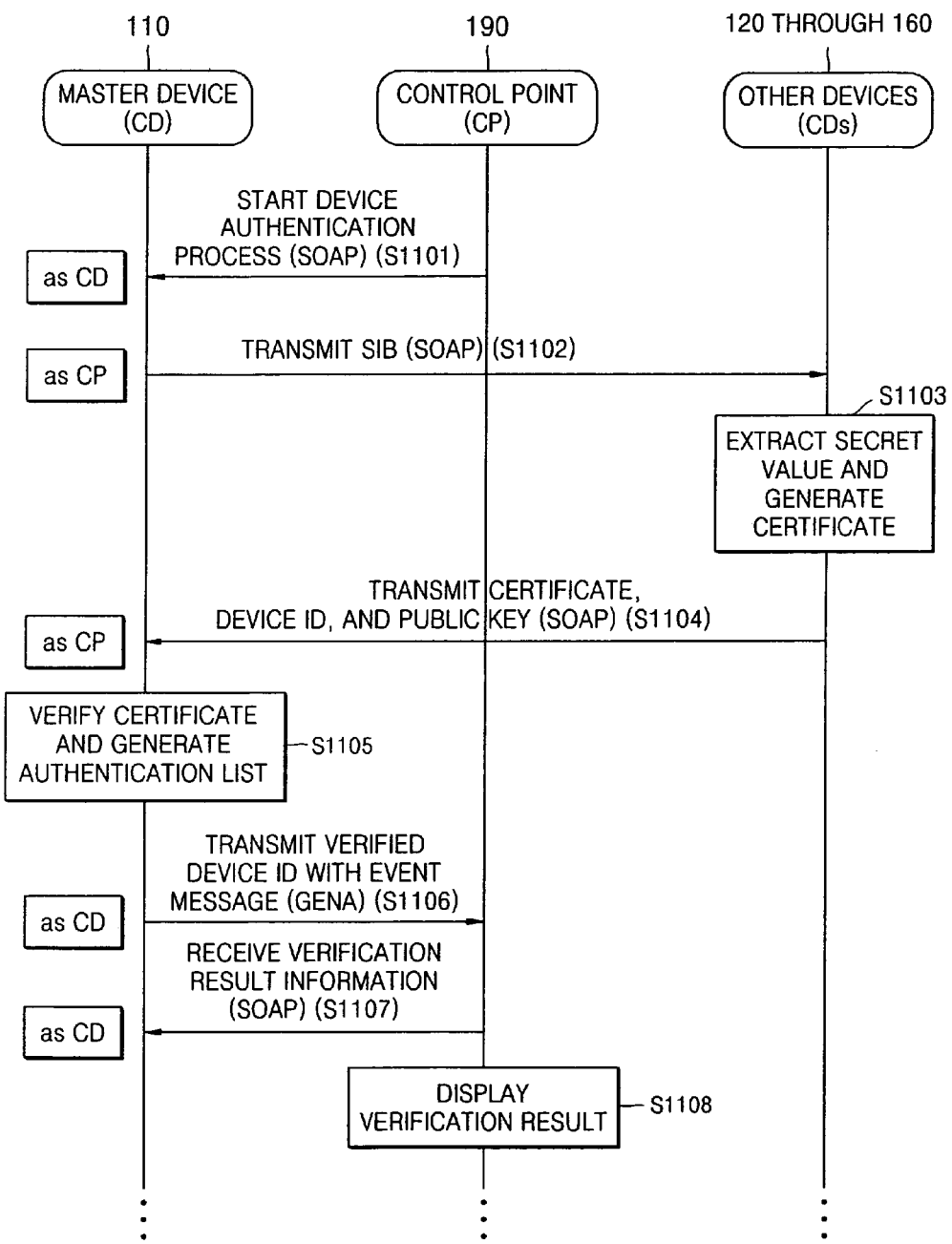
FIG. 11 is a flowchart illustrating a device authentication process, in parallel with the process illustrated in FIG. 10.
Figure 12:
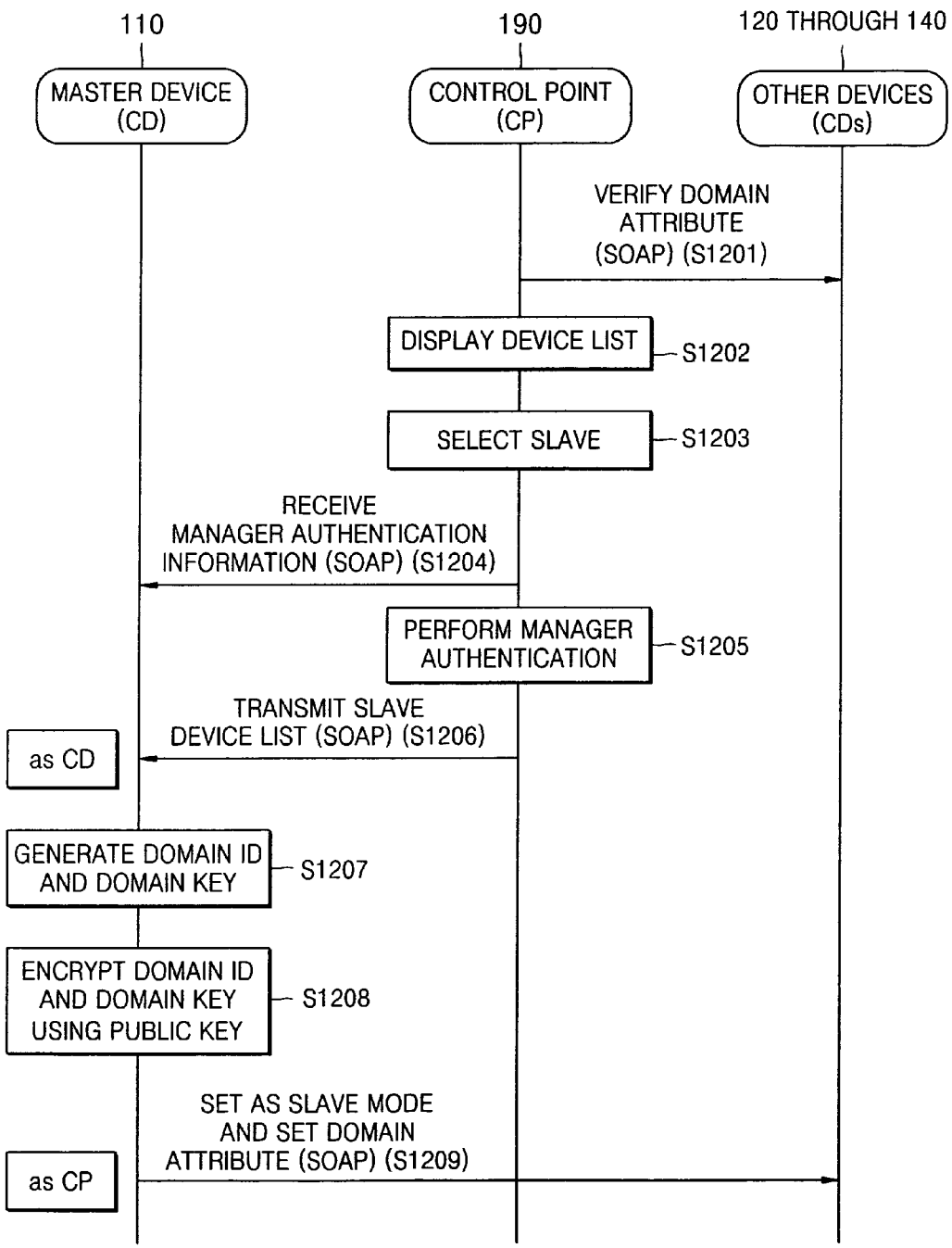
FIG. 12 is a flowchart illustrating a process of determining a slave device, in parallel with the process illustrated in FIG. 11.

FIGS. 10 through 12 are flowcharts illustrating operation processes when important functions of a control point 190 are moved to a master device 110 different from FIGS. 6 through 8. Here, functions of the control point 190 are limited only to handle operations related to a user interface. That is, the master device 110 further includes functions as a control point except the limited functions of the control point 190 besides functions as a controlled device. Accordingly, there are less operations performed by the control point 190, and even if the control point 190 is an illegal device, there are no security problems. Also, there are no operating problems even if there is no user interface in the master device 110.

FIG. 10 is a flowchart illustrating another process of determining a master device according to an embodiment of the present invention. Since a first controlled device 110 operates only as a controlled device during the process, the process illustrated in FIG. 10 is the same as that illustrated in FIG. 6.

FIG. 11 is a flowchart illustrating a device authentication process, in parallel with the process of determining a master device illustrated in FIG. 10.

Referring to FIG. 11, first, a control point 190 notifies a master device 110 of start of a device authentication process using the SOAP in step S1101. In step S1101, the master device 110 operates as a CD. Then, the master device 110 (operates as a CP) directly transmits the SIB to other controlled devices 120 through 160 using the SOAP in step S1102. Each of the other controlled devices 120 through 160 extracts a secret value using the SIB and generates a certificate using the secret value and a personal device ID and a personal public key in step S1103.

Next, the other controlled devices 120 through 160 directly transmit the certificates, the device IDs, and the public keys to the master device 110 using the SOAP in step S1104. Then, the master device 110 verifies the received certificates and generates an authentication list of the controlled devices in step S1105. Devices treated as illegal devices as a result of the certificate verification are excluded from the domain, and there is no possibility for the devices to be designated as slave devices. The master device 110 (operates as a CD) notifies the control point 190 of IDs of the verified devices with an event message using a GENA in step S1106. The control point 190 receives the verification result of the devices from the master device 110 (operates as a CD) using the SOAP in step S1107 and then displays whether or not the verified devices are illegal using a user interface in step S1108.

FIG. 12 is a flowchart illustrating a process of determining a slave device, in parallel with the device authentication process illustrated in FIG. 11.

Referring to FIG. 12, first, a control point 190 verifies domain attributes of devices 120 through 140 authenticated as legal devices as a result of the certificate verification using the SOAP in step S1201. If there are no domain attributes in the devices, the control point 190 displays a list of the devices using a user interface in step S1202 and allows a user to select slave devices using the user interface in step S1203. An example of the user interface displaying a list of legal devices is shown in FIG. 9C. The user can select slave devices by checking devices to be included in a domain. The control point 190 receives manager authentication information from a master device 110 in step S1204 and performs manager authentication in step S1205 such a method as illustrated in FIG. 6.

Next, the control point 190 transmits a list of the selected slave devices 120 through 140 to the master device 110 (operates as a CD) using the SOAP in step S1206. The master device 110 generates a domain ID and a domain key in step S1207. Here, the domain ID is used for distinguishing an own domain from other domains, and if the domain ID is unique for the domain, a generating method is not carried out. Therefore, the domain ID may be a random number generated by a random number generator or a hash value of a value merging device IDs of slave devices and a certain random number. That is, the domain ID is not generated by limiting the generating method to specific methods. Likewise, the domain key may be a random number generated by a random number generator or a hash value of a value merging device IDs of slave devices and a certain random number. However, since the domain key is changed according to a change status of member devices of the domain, it is preferable that the domain key is generated using the device IDs of the slave devices.

When the domain ID and the domain key are generated, the master device 110 encrypts the domain ID and the domain key using public keys of the slave devices in step S1208. The master device 110 (operates as a CP) directly sets device modes of the selected devices as a slave status and transmits domain attributes of the set devices to the set devices in step S1209. Also, the master device 110 stores the slave device list of the devices selected as slave devices.

Figure 13:
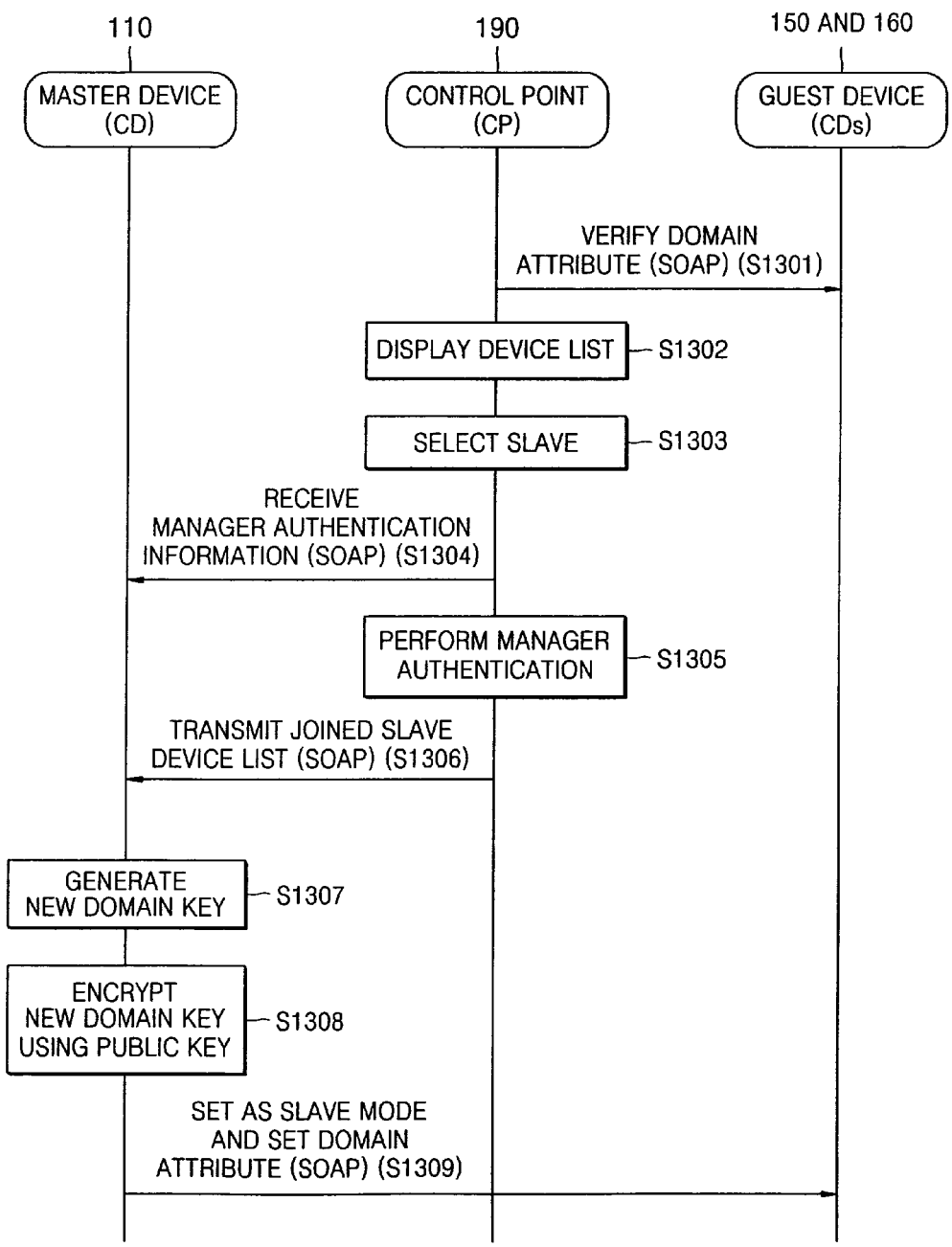
FIG. 13 is a flowchart illustrating a process of generating a domain key according to an embodiment of the present invention.

FIG. 13 is a flowchart illustrating a process when controlled devices 150 and 160, which have been guest devices in a currently authenticated domain, are joined as slave devices according to an embodiment of the present invention. FIG. 13 illustrates a case where important functions of a control point are moved to a master device and the control point mainly performs only a user interface function.

To join slave devices, if a user selects a slave device join menu using a user interface provided by a control point 190, the control point 190 verifies domain attributes of devices 120 through 160 authenticated as legal devices as a result of the certificate verification using the SOAP in step S1301. If the devices 150 and 160 among the devices 120 through 160 are without domain attributes, the control point 190 displays a list of the devices 150 and 160 using the user interface in step S1302 and allows the user to select slave devices using the user interface in step S1303. The user can select the slave devices by checking guest devices among legally authenticated devices on a user interface screen as shown in FIG. 9C. The control point 190 receives manager authentication information from a master device 110 in step S1304 and performs manager authentication in step S1305 such a method as illustrated in FIG. 6.

The control point 190 transmits a list of the selected slave devices 150 and 160 to the master device 110 using the SOAP in step S1306. The master device 110 generates a new domain key using a list of the devices 120 through 140 previously selected as slave devices and device information (for example, a device ID) of the devices 150 and 160 newly selected as slave devices in step S1307. That is, since the domain key is a secret key that member devices of the domain must share, it is preferable that the domain key be generated using information of the member devices of the domain. Therefore, a new domain key is generated according to a change status of the member devices of the domain. Here, since a domain ID is an identifier for distinguishing an own domain from other domains, the domain ID is not changed as long as the master device 110 is not changed. The master device 110 encrypts the new domain key using public keys of the slave devices in step S1308. The master device 110 directly sets device modes of the selected devices as a slave status and transmits new domain attributes including the new domain key to the slave devices in step S1309.

A process of joining a new slave device in an authenticated domain has been described above, and likewise, the user can remove the devices set as slave devices form the authenticated domain using the user interface screen. The master device 110 also deletes the removed slave devices from the slave device list of the master device 110 and generates a new domain key using information of remained slave devices in a similar way as that illustrated in FIG. 13.

Terminology, such as joining or removing, is used when a configuration of a domain is changed by changing a slave device list in a master device under permission of a user via a control point. That is, joining and removing respectively refer to a situation where a slave device is connected to the domain, such as a case where the slave device is physically added to a control point without permission of the user via the control point or a case where the slave device is turned on, and a situation where the slave device is disconnected from the domain, such as a case where the slave device is physically set aside from the control point without permission of the user via the control point or a case where the slave device is turned off.

Meanwhile, when a slave device 120 among slave devices (for example, 120 through 140) of an authenticated domain is removed from the domain and a guest device 150 among other guest devices (for example, 150 and 160) joins the domain as a slave device, a new domain key is generated through a process as illustrated in FIG. 13. If the removed slave device 120 joins the authenticated domain again, a new domain key is generated by reflecting device information of the slave device 120. The joining or removing of a slave device is determined by a user and does not frequently occur. However, for example, in a case where slave devices are home appliances, a situation where they are turned on/off (that is, connected/disconnected) occurs frequently. In this case, a domain key is changed frequently, which can annoy a user and additionally load a system.

Therefore, in the present invention, a session ID is used as an identifier for distinguishing the joining/removing of slave devices when connecting/disconnecting the slave devices. The session ID is changed according to the joining/removing of the slave devices, not according to the connection/disconnection of the slave devices, and shared by a master device and the slave devices. Also, the session ID can be generated randomly or using information of member devices of a domain, and it is preferable that the session ID be encrypted using public keys of the slave devices and transmitted to the slave devices. The session ID can include a unique ID, date information, and version information.

Meanwhile, several items must be considered according to a situation where the slave devices are connected to or disconnected from the domain.

Figure 14:
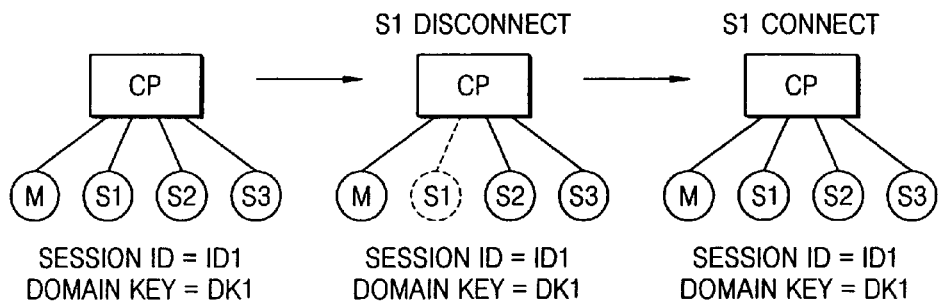
FIG. 14 illustrates a domain status according to connect/disconnect of a slave device.

As shown in FIG. 14, in a case where a slave device S1 is connected to a control point CP again after a predetermined time has passed since the slave device S1 was disconnected from the control point CP, a session ID and a domain key shared by a master device M and slave devices S1, S2, and S3 are not changed when the slave device S1 is connected or disconnected. Therefore, the slave device S1 can use content with the domain key before being disconnected.

Figure 15:
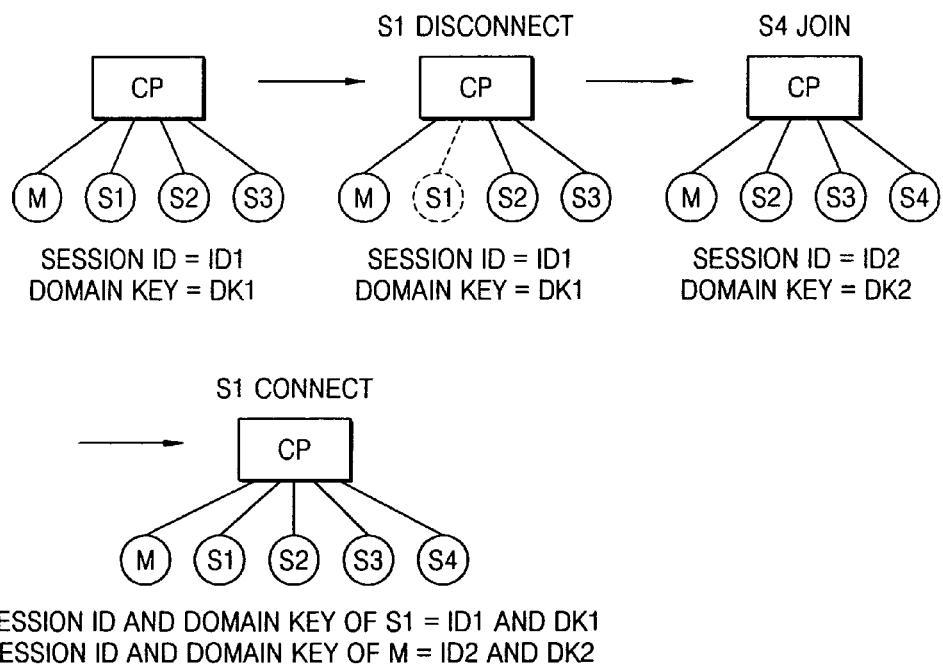
FIG. 15 illustrates another domain status according to connect/disconnect of a slave device.

However, as shown in FIG. 15, in a case where another slave device S4 joins a domain when a slave device S1 is disconnected from a control point CP, a session ID and a domain key shared by a master device M and slave devices S1, S2, S3, and S4 are changed. Therefore, in a case where the slave device S1 is connected to the domain again, the slave device S1 cannot smoothly use or reproduce content shared in the domain. Accordingly, the master device M compares a session ID of the master device M and a session ID of a device newly connected to the domain, and if the two session IDs are not the same, the master device M transmits a domain key DK2 newly generated when the slave device S4 joined the domain to the slave device S1. Also, since the session ID and domain key of the master device M are also changed in a case where the slave S2 is removed when the slave device S1 is disconnected, a process as illustrated in FIG. 15 is performed. The control point (CP) senses a predetermined device to be connected, transmits a session ID of the connected device to the master device M, and transmits information of the master device M to member devices of the domain.

A slave device list stored in the master device M is not changed when slave devices are connected or disconnected until a user changes the slave device list via the control point (CP). Therefore, if the user deletes the slave device S1 from the slave device list when the slave device S1 has been disconnected, the slave device S1 loses qualification as a slave device. However, since a device mode of the disconnected slave device S1 is still set as a slave status, if the slave device S1 is connected again, the master device M has to examine whether the slave device S1 exists in the slave device list besides the session ID and to change a device mode of a device that does not exist in the slave device list to a guest status. Otherwise, since the slave device S1, which is in a guest status in reality, shares the new domain key without permission of the user, a structure of an entire system is broken down.

Figure 16:
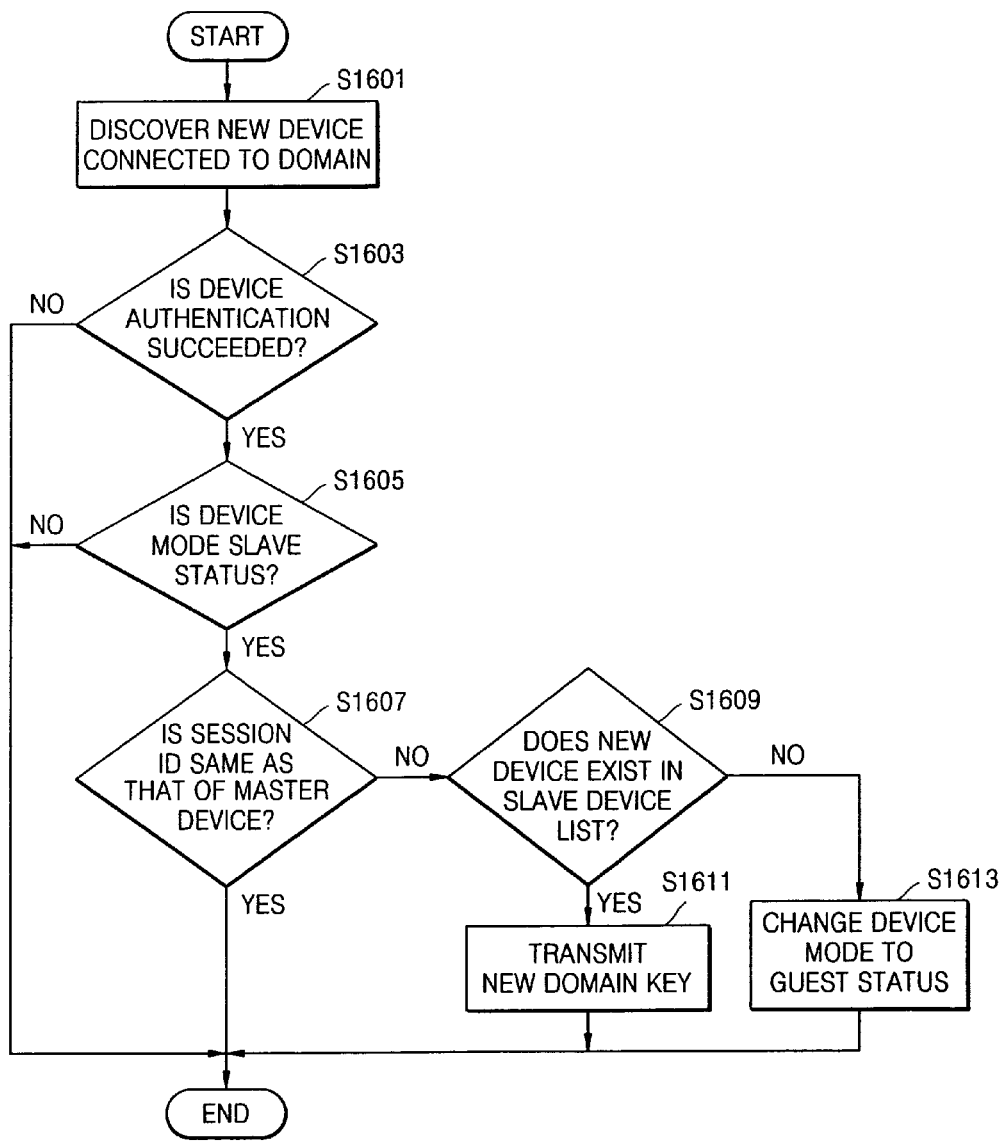
FIG. 16 is a flowchart illustrating a process of handling a device newly connected to a domain according to an embodiment of the present invention.

FIG. 16 is a flowchart illustrating a process of handling a device newly connected to a domain according to an embodiment of the present invention.

Referring to FIG. 16, when a control point discovers a new device, which is newly connected in a domain in step S1601, a device authentication process as illustrated in FIG. 7 is performed in step S1603. If the authentication failed, the process is terminated by regarding the connected device as an illegal device, and if the authentication succeeded, it is determined whether a device mode of the connected device is a slave status in step S1605.

If the device mode of the connected device is a guest status, the process is terminated, and if the device mode of the connected device is the slave status, it is determined whether a session ID of the connected device is the same as that of a master device in step S1607. If the session ID of the connected device is the same as that of the master device, the process is terminated because a domain key is not changed either. If the session ID of the connected device is not the same as that of the master device, it is necessary that a new domain key is transmitted to the connected device because a domain key of the master device is not the same as that of the connected device. However, even so the session ID of the connected device is not the same as that of the master device, if the new domain key is transmitted to the connected device right away, a device, whose device mode is a guest status in reality, may be admitted as a slave device. Therefore, it must be determined whether the connected device exists in a slave device list stored in a master device M in step S1609.

If the connected device exists in the slave device list, since the connected device is considered to maintain the device mode as a slave status, the new domain key is transmitted to the connected device in step S1611, and if the connected device does not exist in the slave device list, the device mode of the connected device is changed to the guest status in step S1613. The connected device, whose device mode is changed to the guest status, can be selected as a slave device by performing such a process as illustrated in FIG. 8.

If a multi-domain policy in which a slave device can join a plurality of domains is adopted, the process may be terminated before following steps (S1605 through S1611) are performed for a connected device without having a proper domain ID by comparing domain IDs before session IDs are compared. Also, even if a slave device can have only one domain ID since the multi-domain policy is not adopted, the process may also be terminated before the following steps (S1605 through S1611) are performed for a device whose domain ID is changed due to joining another domain. Therefore, for the above two cases, it is preferable to compare a domain ID of a connected device and that of a current domain at least before step S1607.

As described above, a session ID may further include date information and/or version information besides a unique ID. If the date information or the version information is included in the session ID, an old session ID and a current session ID can be distinguished more clearly. Accordingly, a plurality of services can be provided using the information. For example, when a master device is disconnected, a control point confirms date information and version information of session IDs of slave devices, and if domain IDs are the same but session IDs are different, it can be known that a configuration of a domain is changed when a slave device is disconnected. Therefore, even if the master device is disconnected from the domain, session IDs and domain keys of remained slave devices can be changed using a slave device having a latest session ID and domain key by using the date information or the version information.

Figure 17:
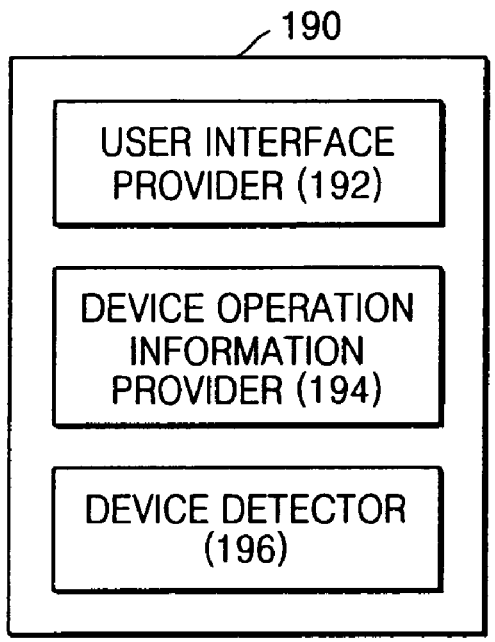
FIG. 17 is a block diagram of a control point according to an embodiment of the present invention.

FIG. 17 is a block diagram of the control point 190 shown in FIG. 4 according to an embodiment of the present invention.

Referring to FIG. 17, the control point 190 includes a user interface provider 192 providing user interfaces as shown in FIGS. 9A through 9C, a device operating information provider 194 providing information necessary for operation of devices connected to the control point 190 to a master device and slave devices, and a device detector 196 detecting devices connected to the control point 190.

The user interface provider 192 displays a device list or a device authentication result on a user interface screen. A user can select a master device and slave devices and change a slave device list and also store an illegal device list in the master device according to the device authentication result. The device operating information provider 194 transmits information necessary for operation of devices to the devices as illustrated in FIGS. 6 through 8 and 10 through 12. The device detector 196 senses devices connected to or disconnected from the control point 190 and transmits information of corresponding devices to the device operating information provider 194. The device operating information provider 194 transmits the information to the devices, and then, for example, the process illustrated in FIG. 16 can be performed.

Figure 18:
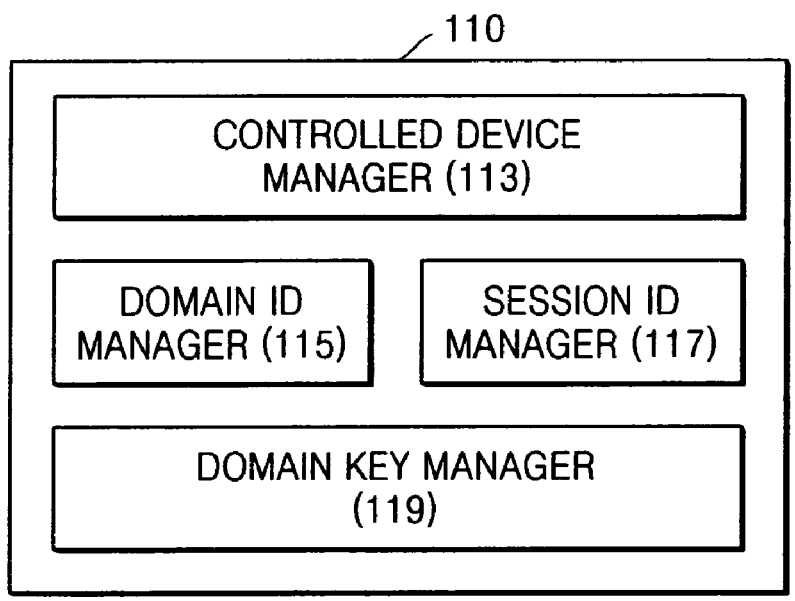
FIG. 18 is a block diagram of a master device according to an embodiment of the present invention.

FIG. 18 is a block diagram of the master device 110 shown in FIG. 4 according to an embodiment of the present invention.

Referring to FIG. 18, the master device 110 includes a controlled device manager 113, which performs authentication, device mode determination, and slave device list management of controlled devices connected to the master device 110 via the control point 190, a domain ID manager 115, which performs generation of a domain ID and examination of the domain IDs of devices connected in a domain, a session ID manager 117, which performs generation of a session ID, change of the session ID, and examination of the session IDs of devices connected in the domain, and a domain key manager 119, which performs generation of a domain key, change of the domain key, and transmission of the domain key to slave devices.

The controlled device manager 113 performs authentication of a controlled device connected in a domain according to a flowchart of FIG. 7 or 11 and determines whether the authentication of the controlled device succeeded in step S1603 of FIG. 16. At this time, if the authentication failed, the controlled device manager 113 can regard the connected controlled device as an illegal device and separately store the name thereof in an illegal device list. Also, the controlled device manager 113 determines whether a device mode of the controlled device connected in the domain is a slave status or a guest status in step S1605 of FIG. 16. At this time, if the device mode is not in the slave status, the controlled device manager 113 outputs an error signal, and a user may register the connected controlled device as a slave device by a normal process or remove the connected controlled device according to the error signal. Also, the controlled device manager 113 generates and changes the slave device list according to a user's command via the control point 190 and determines whether a controlled device, whose session ID is not the same as that of the master device 110, exists in the slave device list in step S1609 of FIG. 16, and if the controlled device does not exist, the controlled device manager 113 controls the controlled device so that the device mode of the controlled device is changed to the guest status.

The domain ID manager 115 generates a domain ID and transmits the domain ID to member devices of the domain, and if a new controlled device is connected to the domain, the domain ID manager 115 compares a domain ID of the master device 110 and that of the controlled device connected in the domain before at least step S1607 of FIG. 16, and if the two domain IDs are not the same, the domain ID manager 115 outputs an error signal, and the user performs a predetermined process according to the error signal.

The session ID manager 117 generates a session ID, generates a new session ID according to a change of the slave device list, and compares a session ID of the master device 110 and that of the controlled device connected in the domain in step S1607 of FIG. 16, and if the two session IDs are not the same, the session ID manager 117 transmits the session ID of the master device to the controlled device.

The domain key manager 119 generates a domain key, generates a new domain key according to a change of configuration of the domain, and transmits the generated domain key to slave devices.

As described above, according to the present invention, a user can directly control formation of a domain and build the domain more safely.

Also, according to the present invention, a home network system of a UPnP infrastructure which can smoothly be integrated in a network using a conventional standard Internet protocol can be developed.

Also, according to the present invention, a process of changing a domain key according to domain configuration change can be simplified by allowing a user to directly control change of member devices of a domain of a home network, a master device to generate a new domain key according to change of the member devices, and slave devices to receive the domain key generated by the master device.

Also, according to the present invention, a frequent change of a domain key can be prevented by introducing a session ID besides a domain ID and a domain key as information shared by a domain and not changing the domain key when frequent connect/disconnect of a slave device occurs.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of forming a domain adopting a digital rights management (DRM) based on a predetermined protocol, the method comprising:
   (a) informing a control point which manages the formation of the domain that a device is connected to a network including the domain;
   (b) the informed control point obtaining DRM information of the device from the device; and
   (c) forming the domain based on the obtained DRM information of the device,
   wherein the DRM information includes a device mode which is a value determining whether the device operates as a certain role, including one of a slave device role, a guest device role, and a master device role, in the domain adopting the DRM, wherein, in operation (c), the domain is formed based on the device mode,
   wherein the domain includes at least a master device, a slave device, and the separate control point, and
   wherein the master device receives authentication information of at least one slave device and sends manager authentication information to the control point.

2. The method of claim 1, wherein the predetermined protocol is universal plug-and-play (UPnP).

3. The method of claim 2, wherein, in operation (a), a simple service discovery protocol (SSDP) is used to inform the control point of the connection of the device to the network in an UPnP discovery process.

4. The method of claim 2, wherein, in operation (b), hypertext transfer protocol (HTTP) GET is used to obtain the DRM information in an UPnP description process.

5. A non-transitory computer readable medium having recorded thereon a computer readable program for performing a method of forming a domain adopting a digital rights management (DRM) based on a predetermined protocol, the method comprising:
   informing a control point which manages the formation of the domain that a device is connected to a network including the domain;
   the control point obtaining DRM information of the device from the device; and
   forming the domain based on the obtained DRM information of the device,
   wherein the DRM information includes a device mode which is a value determining whether the device operates as a certain role, including one of a slave device role, a guest device role, and a master device role, in the domain adopting the DRM, wherein the domain is formed based on the device mode,
   wherein the domain includes at least a master device, a slave device, and the separate control point, and
   wherein the master device receives authentication information of at least one slave device and sends manager authentication information to the control point.

6. A method of recognizing a device connected to a network that includes a domain adopting a digital rights management (DRM) based on a predetermined protocol, the method comprising:
   (a) being informed that the device is connected to the network including the domain; and
   (b) recognizing the device by selectively obtaining DRM information of the device from the device,
   wherein the DRM information includes a device mode which is a value determining whether the device operates as a certain role, including one of a slave device role, a guest device role, and a master device role, in the domain adopting the DRM, wherein the domain is formed based on the device mode,
   wherein the domain includes at least a master device, a slave device, and a separate control point, and
   wherein the master device receives authentication information of at least one slave device and sends manager authentication information to the control point.

7. The method of claim 6, wherein the predetermined protocol is Universal Plug-and-Play (UPnP).

8. The method of claim 7, wherein, in operation (a), a simple service discovery protocol (SSDP) is used to inform the control point of the connection of the device to the network in an UPnP discovery process.

9. The method of claim 7, wherein, in operation (b), hypertext transfer protocol (HTTP) GET is used to obtain the DRM information in an UPnP description process.

10. A non-transitory computer readable medium having recorded thereon a computer readable program for performing a method of recognizing a device connected to a network that includes a domain adopting a DRM based on a predetermined protocol, the method comprising:
    being informed that the device is connected to the network including the domain; and
    recognizing the device by selectively obtaining DRM information of the device from the device,
    wherein the DRM information includes a device mode which is a value determining whether the device operates as a certain role, including one of a slave device role, a guest device role, and a master device role, in the domain adopting the DRM, wherein, in operation (b), the device is recognized based on the device mode,
    wherein the domain includes at least a master device, a slave device, and a separate control point, and
    wherein the master device receives authentication information of at least one slave device and sends receives manager authentication information to the control point.

11. A method of providing digital rights management (DRM) information of a device connected to a network that includes a domain adopting a DRM based on a predetermined protocol, the method comprising:
    (a) informing a control point that the device is connected to the network including the domain; and
    (b) providing the DRM information of the device to the control point that is informed of the connection of the device to the network,
    wherein the control point manages formation of the domain,
    and the DRM information includes a device mode which is a value determining whether the device operates as a certain role, including one of a slave device role, a guest device role, and a master device role, in the domain adopting the DRM, wherein the domain is formed based on the device mode,
    wherein the domain includes at least a master device, a slave device, and the separate control point, and
    wherein the master device receives authentication information of at least one slave device and sends manager authentication information to the control point.

12. The method of claim 11, wherein the predetermined protocol is Universal Plug-and-Play (UPnP).

13. The method of claim 12, wherein, in operation (a), a simple service discovery protocol SSDP is used to inform the control point of the connection of the device to the network in an UPnP discovery process.

14. The method of claim 12, wherein, in operation (b), hypertext transfer protocol (HTTP) GET is used to provide the DRM information of the device to the control point in an UPnP description process.

15. A non-transitory computer readable medium having recorded thereon a computer readable program for performing a method of providing digital rights management (DRM) information of a device connected to a network that includes a domain adopting a DRM based on a predetermined protocol, the method comprising:

informing a control point that the device is connected to the network including the domain; and providing the DRM information of the device to the control point that is informed of the connection of the device to the network, wherein the control point manages formation of the domain, and the DRM information includes a device mode which is a value determining whether the device operates as a certain role, including one of a slave device role, a guest device role, and a master device role, in the domain adopting the DRM, wherein the domain is formed based on the device mode, wherein the domain includes at least a master device, a slave device, and the separate control point, and wherein the master device receives authentication information of at least one slave device and sends manager authentication information to the control point.

16. The method of claim 1, wherein the device mode is at least a master device mode.

17. The non-transitory computer readable medium of claim 5, wherein the device mode is at least a master device mode.

18. The method of claim 6, wherein the device mode is at least a master device mode.

19. The non-transitory computer readable medium of claim 10, wherein the device mode is at least a master device mode.

20. The method of claim 11, wherein the device mode is at least a master device mode.

21. The non-transitory computer readable medium of claim 15, wherein the device mode is at least a master device mode.

* * * * *